(12) United States Patent
Mohmeyer et al.

(10) Patent No.: US 10,946,562 B2
(45) Date of Patent: Mar. 16, 2021

(54) SANDWICH STRUCTURE INCLUDING A VIP AND METHOD FOR PRODUCING THE SAME

(71) Applicant: BASF SE, Ludwigshafen am Rhein (DE)

(72) Inventors: Nils Mohmeyer, Mannheim (DE); Marc Fricke, Osnabrueck (DE); Joerg Krogmann, Lohne (DE); Mark Elbing, Bremen (DE); Johann Klassen, Stemwede-Oppendorf (DE); Juergen Boos, Nordhorn (DE)

(73) Assignee: BASF SE, Ludwigshafen (DE)

( * ) Notice: Subject to any disclaimer, the term of this patent is extended or adjusted under 35 U.S.C. 154(b) by 540 days.

(21) Appl. No.: 15/768,927

(22) PCT Filed: Oct. 10, 2016

(86) PCT No.: PCT/EP2016/074158
§ 371 (c)(1),
(2) Date: Apr. 17, 2018

(87) PCT Pub. No.: WO2017/067805
PCT Pub. Date: Apr. 27, 2017

(65) Prior Publication Data
US 2019/0054669 A1 Feb. 21, 2019

(30) Foreign Application Priority Data
Oct. 19, 2015 (EP) .................. 15190365

(51) Int. Cl.
*B29C 44/12* (2006.01)
*B32B 5/20* (2006.01)
*F16L 59/065* (2006.01)
*F25D 23/06* (2006.01)
*E04B 1/80* (2006.01)
(Continued)

(52) U.S. Cl.
CPC .......... *B29C 44/1228* (2013.01); *B32B 5/20* (2013.01); *B32B 5/245* (2013.01); *B32B 5/30* (2013.01); *B32B 5/32* (2013.01); *B32B 13/045* (2013.01); *B32B 15/046* (2013.01); *B32B 21/047* (2013.01); *B32B 27/065* (2013.01); *B32B 27/302* (2013.01); *B32B 27/40* (2013.01); *B32B 37/14* (2013.01); *B32B 38/00* (2013.01); *E04B 1/803* (2013.01); *F16L 59/065* (2013.01); *F25D 23/06* (2013.01); B29K 2075/00 (2013.01); B29K 2105/0005 (2013.01); B29K 2995/0015 (2013.01); B29K 2995/0063 (2013.01); B29L 2031/7622 (2013.01); B29L 2031/776 (2013.01); B32B 2038/0084 (2013.01); B32B 2250/05 (2013.01); B32B 2250/40 (2013.01); B32B 2262/101 (2013.01); B32B 2264/102 (2013.01); B32B 2266/0264 (2013.01);
(Continued)

(58) Field of Classification Search
CPC ............ B29C 44/1228; B29C 44/1219; B29C 44/1233; B29C 44/1266; B29C 44/1276; B29C 44/24; B29C 44/32; B32B 5/20; B32B 5/245; B32B 5/30; B32B 5/32; B32B 13/045; B32B 15/046; B32B 21/047; B32B 27/065; B32B 27/302; B32B 27/40; B32B 37/14; B32B 38/00; E04B 31/803; F16L 59/065; F25D 23/06
See application file for complete search history.

(56) References Cited

U.S. PATENT DOCUMENTS 5,082,335 A 1/1992 Cur et al.
6,164,030 A 12/2000 Dietrich
(Continued)

FOREIGN PATENT DOCUMENTS

AU 2011/246621 B2 11/2011
AU 2011/304551 A1 4/2013
(Continued)

OTHER PUBLICATIONS

International Preliminary Report on Patentability as received in PCT/EP2016/074158 dated Apr. 19. 2018.
(Continued)

*Primary Examiner* — Stella K Yi
(74) *Attorney, Agent, or Firm* — Grüneberg and Myers PLLC

(57) ABSTRACT

The present invention relates to a process for the production of composite elements comprising a first and a second outer layer, a vacuum insulation panel between the two outer layers, rigid polyurethane foam in contact with the first outer layer and the underside of the vacuum insulation panel, and also rigid polyurethane foam in contact with the second outer layer and the upper side of the vacuum insulation panel, comprising application of a reaction mixture (R1) for the production of a rigid polyurethane foam onto the first outer layer, bringing the lower side of a vacuum insulation panel into contact with the unhardened reaction mixture (R1), application of a reaction mixture (R2) for the production of a rigid polyurethane foam to the upper side of the vacuum insulation panel, bringing the second outer layer into contact with the layer of the unhardened reaction mixture (R2), and finally hardening of the two rigid polyurethane foam systems (R1) and (R2) to give the composite element. The present invention further relates to composite elements thus obtainable, and also to the use of a composite element of the invention or of a composite element obtainable by a process of the invention, as component for refrigeration equipment or as construction material.

14 Claims, No Drawings

(51) Int. Cl.

| | | |
|---|---|---|
| *B32B 21/04* | (2006.01) | |
| *B32B 15/04* | (2006.01) | |
| *B32B 5/24* | (2006.01) | |
| *B32B 27/30* | (2006.01) | |
| *B32B 5/30* | (2006.01) | |
| *B32B 27/06* | (2006.01) | |
| *B32B 27/40* | (2006.01) | |
| *B32B 13/04* | (2006.01) | |
| *B32B 5/32* | (2006.01) | |
| *B32B 37/14* | (2006.01) | |
| *B32B 38/00* | (2006.01) | |
| *B29L 31/00* | (2006.01) | |
| *B29K 75/00* | (2006.01) | |
| *B29K 105/00* | (2006.01) | |

(52) U.S. Cl.
CPC ............... *B32B 2266/0278* (2013.01); *B32B 2266/0285* (2013.01); *B32B 2266/08* (2013.01); *B32B 2305/022* (2013.01); *B32B 2305/34* (2013.01); *B32B 2307/302* (2013.01); *B32B 2307/304* (2013.01); *B32B 2307/50* (2013.01); *B32B 2307/72* (2013.01); *B32B 2307/734* (2013.01); *B32B 2311/00* (2013.01); *B32B 2419/00* (2013.01); *B32B 2439/00* (2013.01); *B32B 2509/00* (2013.01); *B32B 2509/10* (2013.01); *B32B 2597/00* (2013.01); *B32B 2605/00* (2013.01); *B32B 2607/00* (2013.01); *F25D 2201/14* (2013.01); *Y02A 30/242* (2018.01); *Y02B 80/10* (2013.01)

(56) References Cited

U.S. PATENT DOCUMENTS

| | | |
|---|---|---|
| 2002/0153817 A1 | 10/2002 | Wenning et al. |
| 2008/0280120 A1 | 11/2008 | Fechner et al. |
| 2009/0136703 A1 | 5/2009 | Carolan et al. |
| 2017/0015027 A1 | 1/2017 | Letts et al. |

FOREIGN PATENT DOCUMENTS

| | | |
|---|---|---|
| DE | 199 48 361 A1 | 4/2001 |
| DE | 10 2008 026 528 A1 | 12/2009 |
| EP | 0 434 225 A1 | 6/1991 |
| EP | 0 822 379 A2 | 2/1998 |
| EP | 2 563 833 | 3/2013 |
| EP | 2 563 860 A2 | 3/2013 |
| JP | 2005-76966 A | 3/2005 |
| WO | WO 2005/026605 A1 | 3/2005 |
| WO | WO 2006/134581 A1 | 12/2006 |
| WO | 2011/134866 A3 | 11/2011 |
| WO | WO 2011/134856 A1 | 11/2011 |
| WO | WO 2012/038215 A1 | 3/2012 |
| WO | WO 2015/153568 A1 | 10/2015 |

OTHER PUBLICATIONS

U.S. Appl. No. 15/514,759, filed Jul. 27, 2017, US2017-0210102, Weigmann.
U.S. Appl. No. 15/105,509, filed Nov. 10, 2016, US2016-0326330, Schuette.
U.S. Appl. No. 15/117,371, filed Dec. 1, 2016, US2016-0347034, Mohmeyer.
U.S. Appl. No. 15/557,924, filed Mar. 1, 2018, US2018-0057654, Fricke.
U.S. Appl. No. 15/326,734, filed Jul. 20, 2017, US2017-0204242, Fricke.
U.S. Appl. No. 15/128,515, filed Sep. 23, 2016, Fricke.
U.S. Appl. No. 15/312,541, filed Mar. 23, 2017, US2017-0081494, Fricke.
U.S. Appl. No. 15/528,308, filed Nov. 30, 2017, US2017-0341945, Forrest.
U.S. Appl. No. 15/551,779, filed Mar. 8, 2018, US2018-0066100, Menon.
U.S. Appl. No. 15/736,994, filed Dec. 15, 2017, Seidleck.
U.S. Appl. No. 15/758,601, filed Mar. 8, 2018, Loelsberg.
U.S. Appl. No. 62/242,324, filed Oct. 16, 2015, Loelsberg.
U.S. Appl. No. 15/767,710, filed Apr. 12, 2018, Loelsberg.
Muchen, C. H. V., et al., Kunststoff-Handbuch, Band 7, Polyurethane 74, 3. Auflage 1993, Kapitel 3.4.1, pp. 104-110.
Herstellung, et al., Polyurethane, Kunststoff-Handbuch, Band 7, 1. Auflage 1966, herausgegeben von Dr. R. Vieweg und Dr. A. Hochtlen, 14 pages.
Muchen, C. H. V., et al., Polyurethane, Kunststoff-Handbuch, Band 7, 1. Auflage 1983, herausgegeben von Dr. Gunter Oertel, Wien, 15 pages.

SANDWICH STRUCTURE INCLUDING A VIP AND METHOD FOR PRODUCING THE SAME

The present invention relates to a process for the production of composite elements comprising a first and a second outer layer, a vacuum insulation panel between the two outer layers, rigid polyurethane foam in contact with the first outer layer and the underside of the vacuum insulation panel, and also rigid polyurethane foam in contact with the second outer layer and the upper side of the vacuum insulation panel, comprising application of a reaction mixture (R1) for the production of a rigid polyurethane foam onto the first outer layer, bringing the lower side of a vacuum insulation panel into contact with the unhardened reaction mixture (R1), application of a reaction mixture (R2) for the production of a rigid polyurethane foam to the upper side of the vacuum insulation panel, bringing the second outer layer into contact with the layer of the unhardened reaction mixture (R2), and finally hardening of the two rigid polyurethane foam systems (R1) and (R2) to give the composite element. The present invention further relates to composite elements thus obtainable, and also to the use of a composite element of the invention or of a composite element obtainable by a process of the invention, as component for refrigeration equipment or as construction material.

Use of vacuum insulation units, also termed vacuum insulation panels, for thermal insulation purposes is increasing. They are used inter alia for refrigeration-equipment housings, containers for refrigerated vehicles, coolboxes, cold stores or district-heating pipes. Their relatively low thermal conductivity gives them advantages over conventional insulation materials: energy-saving potential in comparison with closed-cell rigid polyurethane foams is usually more than 40%. These vacuum insulation units are generally composed of thermally insulating core material, for example open-cell rigid polyurethane (PUR) foam, open-cell extruded polystyrene foam, silica gels, glass fibers, unconsolidated plastics particles, compressed regrind made of rigid PUR foam or of semirigid PUR foam, or perlite, the latter being packed into a gastight film, which is evacuated and sealed by an airtight weld. The vacuum should be below 100 mbar. Given this vacuum, the thermal conductivity of the panels can be less than 10 mW/(m*K), depending on structure and pore size of the core material.

For thermal insulation purposes, the vacuum insulation panels are usually introduced into the component requiring insulation, and secured there. The thermal insulation components described above are mostly components of two compact layers, preferably metal sheets or plastics, for example polystyrene.

In general, in the procedure for the production of refrigerators, the liquid reaction mixture for the rigid PUR foam is injected into a cavity which is generally constructed from metal external walls, a rear wall made of plastic or of a paperboard-based multilayer composite material, and a plastics inliner. If VIPs are introduced into the refrigerator housing or into the door, these must be secured before introduction of the reaction mixture, in order to prevent uncontrolled movement of the elements during formation of the foam in the cavity. A familiar method of securing is provided by the use of double-sided adhesive tape, and here the VIPs are either adhesively-bonded to the internal side of the external metal sheets (JP 2005-076966) or else adhesively-bonded to the inliner (EP-A-0434225).

If the VIP has been secured on the internal side of the metal external walls, the reaction mixture for the rigid PUR foam, as it reacts, flows around said VIP during the foam-filling of the cavity. The heat of reaction produced by the reaction mixture for the rigid PUR foam leads to very substantial heating of the foam in the equipment. Undesired deformation of the housing can occur during the subsequent cooling, caused by different coefficients of expansion of VIP and rigid PUR foam. The resultant differences in deformation are perceptible especially at the side walls. This is in particular true when stainless steel surfaces are used and when a double-sided adhesive tape is used for securing the VIP, because defects here are particularly easily discernible by virtue of the glossy surface, and low metal thicknesses are desirable for cost reasons.

One way of excluding adverse effects on the quality of the surface is to use an additional thick metal sheet for stiffening. This solution is costly and complicated, since production of cavities or the like has to be avoided when the metal sheets are joined together. Another disadvantage is that the weight of the refrigeration equipment is significantly increased.

DE-A 199 48 361 describes a process for securing VIPs on the internal cladding of the housing and the door of refrigeration equipment via an intermediate layer made of a thermal insulation material. The intermediate layer can be a molding or a thermal insulation foam which is not specified in any greater detail and which is applied in liquid form to the internal cladding, and onto which, in this condition, the VIP is placed. Mention is made of the fact that thermal insulation foams are generally based on polyurethane. EP-A 0 822 379 describes the securing of VIPs on rigid panels via a reaction mixture which is conventionally used for rigid PUR foam in the construction of refrigeration equipment, or preferably via a single-component PUR foam, e.g. Assil® from Henkel. The rigid panel is by way of example a metal panel or plastics panel, preferably a metal box. In one embodiment, the reaction mixture for the foam can first be applied to the panel and the VIP can be placed into the reaction mixture while it is still liquid.

Single-component PUR foams (e.g. Assil® from Henkel) typically have a free envelope density of from 20 to 30 g/l and are isocyanate prepolymers comprising pressurized physical blowing agents. These systems have the disadvantage that they harden on exposure to atmospheric pressure and require a number of hours for that purpose. This type of long hardening time is undesirable for refrigerator production for economic reasons, because cycle times of a few minutes are usually achieved here. Free-foamed densities of conventional reaction mixtures used for PUR foam in production of refrigeration equipment are generally from 25 to 45 g/l. In an appropriate example (EP-A 0 822 379), a cyclopentane-containing reaction mixture for PUR foam, made of a polyether polyol (OH number 400) and of a polymeric diphenylmethane diisocyanate is used. The formulation in the example comprises no foam stabilizer. The foam structure is therefore disadvantageously not retained, but instead the foam collapses to a density of about 60 g/l (determined in accordance with DIN EN ISO 845). Because the foam structure is of extremely coarse-cell and open-pore type, the foam surface obtained after adhesive-bonding of the VIPs is characterized by highly uneven areas, known as sink holes. By virtue of the thin metal external wall, these sink holes are clearly discernible externally, and thus reduce the quality of the surface. In order to ensure good area distribution of the reaction mixture for the PUR foam on an equipment wall or below the VIP, it is necessary to maintain a certain minimum mass per unit area (g/m$^2$) for the reaction mixture that is introduced. In the case of conventional systems with densities of from 25 to 45 g/l, adequate masses per unit area can be achieved only by running at high compaction levels (compaction=density of foamed moldings/free envelope density). However, use of high compaction levels implies a requirement to use closed molds. It would then be necessary in practice to use a different appropriately adapted closed mold for each type of refrigeration device. That leads to high production costs. High compaction levels, for example above 3, are also difficult to achieve industrially, because the resulting PUR foam escapes under pressure and causes a problem.

WO 2005/026605 describes moldings made of rigid compact polyurethane or of a rigid polyurethane foam with compact external skin and cellular core (=rigid integral polyurethane foam) comprising at least one vacuum insulation panel, these being used for the production of refrigeration devices. The VIP is introduced into a mold into which the VIP is inserted, and into which the reaction mixture for the PUR foam is then charged. The mold is closed, and once the PUR foam has hardened the molding is removed. The molds are self-supporting, and there is no need for any enclosure into metal housings or plastics housings, as is the case with conventional refrigeration vessels. One of the sides of the molding can, however, be a layer made of metal or plastic, this layer being concomitantly inserted into the mold. The free-foam density of the rigid integral polyurethane foam is from 200 to 800 $kg/m^3$; that of the rigid compact polyurethane is in the range from 700 to 1200 $kg/m^3$. The rigid compact polyurethane is defined as comprising no blowing agent in the formulation. By virtue of the compact external skin, systems of this type have a higher lambda value than rigid PUR foams. Compact systems, too, have a high lambda value, which is disadvantageous for the application.

WO 2012/038215 A1 discloses the use of a specific polyurethane (PUR) foam reaction system for securing, over a substantial surface area, of vacuum insulation panels (VIPs) on a wall of a refrigeration device, and also a process for the production of composite products comprising a wall of a refrigeration device, a PUR foam layer and at least one VIP.

DE 10 2008 026 528 A1 describes a process for the production of a composite product made of a vacuum insulation panel and of an external wall of refrigeration equipment with use of a liquid reaction mixture for PUR foam. The reaction mixture for PUR foam is applied as hardenable adhesive layer, over a substantial area, to the internal side of the external wall of a refrigeration device and/or to the external side of a wall of the internal vessel of a refrigeration device, and the VIP is inserted therein. Foaming takes place in a closed mold until complete hardening of the reaction mixture has been achieved. It is said that the foam system can be processed with relatively high density. The reaction mixture used for the PUR foam is preferably a foam system that expands slowly and is characterized only by way of the fiber time of about 3 minutes.

A frequent disadvantage of the processes known from the prior art is that it is necessary to fill prescribed cavities with foam, and is therefore difficult to manufacture thin layers without defects. Various supportive structures are moreover necessary in order to protect the delicate VIP from pressure and loads during the production process.

One of the objects underlying the present invention was to provide stable composite elements and simplified processes for production thereof. One of the objects underlying the present invention was to provide composite elements that provide good insulation and simplified processes for production thereof.

Said object is achieved in the invention via a process for the production of a composite element comprising a first and a second outer layer, a vacuum insulation panel between the two outer layers, rigid polyurethane foam in contact with the first outer layer and the underside of the vacuum insulation panel, and also rigid polyurethane foam in contact with the second outer layer and the upper side of the vacuum insulation panel, comprising the following steps:

(i) application of a reaction mixture (R1) for the production of a rigid polyurethane foam onto the first outer layer,
(ii) bringing the lower side of a vacuum insulation panel into contact with the unhardened reaction mixture (R1),
(iii) application of a reaction mixture (R2) for the production of a rigid polyurethane foam to the upper side of the vacuum insulation panel,
(iv) bringing the second outer layer into contact with the layer of the unhardened reaction mixture (R2),
(v) hardening of the two rigid polyurethane foam systems (R1) and (R2) to give the composite element.

The term "unhardened" means for the purposes of the present invention that the fiber time has not yet been reached. The fiber time of a rigid foam system here is the time that elapses before the juncture at which fibers can be drawn from the foam with a glass rod. A method for the determination of fiber time is defined in the examples.

The process of the invention has the advantage of providing, by virtue of the layered build system, a simple manufacturing process. There is no need for foam-filling of cavities, and therefore layers are obtained which have good insulating properties throughout, i.e. have no defects that would impair insulation effect.

The process of the invention begins by applying a reaction mixture (R1) for the production of a rigid polyurethane foam to a first outer layer. The lower side of a vacuum insulation panel is then brought into contact with the unhardened reaction mixture (R1), and a reaction mixture (R2) for the production of a rigid polyurethane foam is applied to the upper side of the vacuum insulation panel. Finally, the second outer layer is brought into contact with the layer of the unhardened reaction mixture (R2), and then the two rigid polyurethane foam systems (R1) and (R2) are hardened to give the composite element.

The process of the invention therefore has the further advantage that the VIP is placed into the unhardened reaction mixture (R1), and therefore, during the formation of the foam, the layer also forms at the edges of the VIP, these therefore having good protection.

The first and second outer layer used in the invention can be composed of very different materials, for example metal, plastic or wood. For construction applications it is also possible to use outer layers made of stoneware, concrete or ceramic material. The outer layer here can be smooth or can have a shape, as long as good adhesion of the reaction mixture is ensured. Outer layers made of metal are preferred in the invention.

Preference is therefore given in the invention to a process as described above where the composite elements are produced without introduction, into an intervening space between the first and second outer layer, of polyurethane starting compounds that are still flowable.

The process of the invention uses reaction mixtures (R1) and (R2). Reaction mixtures (R1) and (R2) in the invention are reaction mixtures for the production of a rigid polyurethane foam. The reaction mixtures (R1) and (R2) usually comprise at least one polyisocyanate as component A) and at least one polyfunctional compound reactive toward isocyanates as component B). The reaction mixture (R1) and the reaction mixture (R2) preferably comprise other conventional components for the production of polyurethane foams, examples being blowing agents, catalysts, foam stabilizers and further auxiliaries and/or additional substances.

Another embodiment of the present invention accordingly provides a process for the production of a composite element as described above where the reaction mixtures (R1) and (R2) comprise the following components:
A) at least one polyisocyanate,
B) at least one polyfunctional compound reactive toward isocyanates,
C) at least one blowing agent,
D) at least one catalyst,
E) optionally foam stabilizers and
F) optionally further auxiliaries and/or additional substances.

The reaction mixture (R1) and the reaction mixture (R2) are obtained in the invention by mixing of the components in a suitable mixing ratio, and applied while the mixture is unhardened. Suitable mixing ratios of the polyol components to the isocyanate here are by way of example in the range from 100:70 to 100:150, preferably from 100:80 to 100:140.

The reaction mixture (R1) and the reaction mixture (R2) are applied in the invention, and foaming begins. The reaction mixture (R1) for the production of a rigid polyurethane foam is first applied to the first outer layer. The reaction mixture (R1) is then, before the fiber time has been reached, brought into contact with the lower side of a vacuum insulation panel in such a way that the foam, as it forms, comes into contact with a substantial area of the VIP. The reaction mixture (R2) for the production of a rigid polyurethane foam is preferably applied to the upper side of the vacuum insulation panel, preferably before the reaction mixture (R1) has reached its fiber time.

It has been found that when the reaction mixture (R2) is applied before the reaction mixture (R1) has reached its fiber time, better distribution of the reaction mixture (R1) is achieved, and fewer defects are therefore formed. The final result of this is better thermal insulation and also a better appearance of the resultant composite element.

Another embodiment of the present invention accordingly provides a process for the production of a composite element as described above, where the reaction mixture (R2) is applied while the reaction mixture (R1) is unhardened.

Another embodiment of the present invention accordingly provides a process for the production of a composite element as described above where step (iii) is carried out while the reaction mixture (R1) is unhardened.

Another embodiment of the present invention accordingly provides a process for the production of a composite element as described above where components A) to F) are selected in such a way as to give a closed-cell polyurethane foam with free-foamed envelope density in accordance with DIN 53420 in the range from 30 to 400 g/l, preferably in the range from 40 to 300 g/l, particularly preferably in the range from 50 to 150 g/l, and with compressive strength in accordance with DIN ISO 844 EN DE (2014-11) greater than 140 kPa.

It is preferable that the reaction mixture (R1) and the reaction mixture (R2) are mixtures for the production of a rigid polyurethane foam which can preferably be applied in a thin layer and nevertheless has sufficient strength to stabilize the composite element. The free-foamed envelope density of the polyurethane foam used in the invention is determined in accordance with DIN 53420, and is preferably from 30 to 400 g/l, in particular from 40 to 300 g/l, more preferably from 50 to 150 g/l.

The compressive strength of the foam is determined in accordance with DIN ISO 844 EN DE (2014-11). The polyurethane foam used in the invention is therefore a semirigid foam or a rigid foam (in accordance with DIN 7726).

Another embodiment of the present invention accordingly provides a process for the production of a composite element as described above where the free-foamed envelope density in accordance with DIN 53420 of the rigid polyurethane foam obtained from the reaction mixture (R1) or of the rigid polyurethane foam obtained from the reaction mixture (R2) in the composite element or of the rigid polyurethane foam obtained from the reaction mixture (R1) and the reaction mixture (R2) is in the range from 30 to 400 g/l.

It is even more preferable that reaction mixture (R1) and reaction mixture (R2) are applied in thin layers. A suitable measure is the mass per unit area. The term mass per unit area means the mass of material introduced per unit area, i.e. of the reaction mixture including components A) to G). The mass per unit area of the reaction mixture (R1) and, respectively, (R2) used in the invention is in the range from 200 to 9600 g/m$^2$, preferably from 230 to 6000 g/m$^2$, particularly preferably from 260 to 4500 g/m$^2$.

The polyurethane foam used in the invention is preferably a closed-cell foam (DIN 7726); the proportion of open cells is at most 15%.

Component A) used in the invention comprises at least one polyisocyanate. Organic isocyanates used can comprise any of the usual aliphatic, cycloaliphatic, and preferably aromatic, di- and/or polyisocyanates. Preferred isocyanates that can be used comprise tolylene diisocyanate (TDI) and/or diphenylmethane diisocyanate (MDI), preferably MDI, and particularly preferably mixtures of MDI with polymeric diphenylmethane diisocyanate (PMDI). These particularly preferred isocyanates can have been modified entirely or to some extent with uretdione groups, carbamate groups, isocyanurate groups, carbodiimide groups, allophanate groups, and preferably urethane groups.

Materials particularly suitable in the invention are by way of example mixtures of MDI with polymeric diphenylmethane diisocyanate (PMDI), in particular with polymeric diphenylmethane diisocyanate (PMDI) that is obtainable by way of example with the trademark Lupranat M20 from BASF SE.

Isocyanate component used can moreover comprise prepolymers, or else mixtures of the isocyanates described above with prepolymers. These prepolymers are produced from the isocyanates described above and the polyethers or polyesters described at a later stage below, or both, and their NCO content is usually in the range from 14 to 32% by weight, preferably from 22 to 30% by weight.

Component B) used comprises at least one polyfunctional compound reactive toward isocyanates, and it is also possible here to use mixtures of a plurality of these compounds as component B). Relatively high-molecular-weight compounds used having groups reactive toward isocyanates can comprise any of the compounds having at least two groups reactive toward isocyanates, for example OH-, SH-, NH- and CH-acid groups. It is usual to use polyetherols and/or polyesterols having from 2 to 8, preferably from 2 to 6, hydrogen atoms reactive toward isocyanate. The OH number of these compounds is usually in the range from 30 to 850 mg KOH/g, preferably in the range from 100 to 500 mg KOH/g measured in accordance with DIN 53240 (1971-12).

The compounds having at least two hydrogen atoms reactive toward isocyanate groups are in most cases polyhydric alcohols. Those of the greatest industrial significance are polyester alcohols and polyether alcohols.

Polyether alcohols are mostly produced by addition reactions of alkylene oxides, preferably ethylene oxide and/or propylene oxide, onto polyhydric alcohols and/or onto polyfunctional amines. The addition reaction here usually takes place in the presence of catalysts.

All of these processes are known to the person skilled in the art. A brief overview of the production of PUR foams has been by way of example published in Polyurethane, Kunststoff-Handbuch Plastics handbook], vol. 7, $1^{st}$ edn. 1966, edited by Dr. R. Vieweg and Dr. A. Höchtlen, and $2^{nd}$ edn. 1983, edited by Dr. Günter Oertel, Carl Hanser Verlag Munich, Vienna.

Polyetherols are produced by known processes, for example by anionic polymerization of alkylene oxides with addition of at least one starter molecule comprising from 2 to 8, preferably from 2 to 6, reactive hydrogen atoms, in the presence of catalysts. Catalysts that can be used comprise alkali metal hydroxides, for example sodium hydroxide or potassium hydroxide, or alkali metal alcoholates, for example sodium methanolate, sodium ethanolate or potassium ethanolate or potassium isopropanoate, or, in the case of cationic polymerization, Lewis acids, for example antimony pentachloride, boron trifluoride etherate or bleaching earth as catalysts. Other compounds that can be used as catalysts are double metal cyanide compounds, known as DMC catalysts. Amine catalysis is also possible, for example using imidazole. Suitable catalysts are described by way of example in EP 2 563 833 A1 or EP 2 563 860 A2.

Alkylene oxides used preferably comprise one or more compounds having from 2 to 4 carbon atoms in the alkylene moiety, for example ethylene oxide, propylene 1,2-oxide, tetrahydrofuran, propylene 1,3-oxide or butylene 1,2- or 2,3-oxide, in each case alone or in the form of mixtures, particular preference being given to ethylene oxide and/or propylene 1,2-oxide.

Starter substances that can be used are in particular compounds having at least 2, preferably from 2 to 8, hydroxy groups or having at least one primary amino group in the molecule. Starter substances that can be used having at least 2, preferably from 2 to 8 hydroxy groups in the molecule are by way of example ethylene glycol, diethylene glycol, glycerol, trimethylolpropane, pentaerythritol, sugar derivatives, such as sucrose or hexitol derivatives, such as sorbitol or mannitol, preference being given to trimethylolpropane, glycerol, pentaerythritol, sugar compounds such as glucose, sorbitol, mannitol and sucrose, polyhydric phenols, resols, for example oligomeric condensates of phenol and formaldehyde, and Mannich condensates derived from phenols, formaldehyde and dialkanolamines; it is also possible to use melamine.

Preferred starter substances used having at least one primary amino group in the molecule are aromatic di- and/or polyamines, for example phenylenediamines, and 4,4'-, 2,4'- and 2,2'-diaminodiphenylmethane, and also aliphatic di- and polyamines, for example ethylenediamine. Ethanolamine and tolylenediamine, preferably vic-tolylenediamine, are also suitable.

Preference is given for the purposes of the present invention to compounds based on glycerol and propylene oxide, sucrose/pentaerythritol/diethylene glycol and propylene oxide, monopropylene glycol and propylene oxide, sucrose/glycerol and propylene oxide, or tolylenediamine (TDA) and ethylene oxide and/or propylene oxide.

The polyester alcohols used are mostly produced by condensation of polyhydric alcohols having from 2 to 12 carbon atoms, for example ethylene glycol, diethylene glycol, butanediol, trimethylolpropane, glycerol or pentaerythritol, with polybasic carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the acids mentioned.

Other starting materials that can also be used concomitantly in the production of the polyesters are hydrophobic substances. The hydrophobic substances are water-insoluble substances which comprise a nonpolar organic moiety, and also have at least one reactive group selected from hydroxy, carboxylic acid, carboxylic ester and mixtures thereof. The equivalent weight of the hydrophobic materials is preferably from 130 to 1000 g/mol. It is possible by way of example to use fatty acids, for example stearic acid, oleic acid, palmitic acid, lauric acid or linoleic acid, and also fats and oils, for example castor oil, maize oil, sunflower oil, soybean oil, coconut oil, olive oil or tall oil.

The functionality of the polyesterols used is preferably in the range from 1.5 to 5, particularly from 1.8 to 3.5.

Other polyols can moreover be used, for example aliphatic, cycloaliphatic and/or aromatic diols having from 2 to 14, preferably from 2 to 10, carbon atoms, for example ethylene glycol, 1,2-propanediol, 1,3-propanediol, 1,2-pentanediol, 1,3-pentanediol, 1,10-decanediol, 1,2-, 1,3- and 1,4-dihydroxycyclohexane, di- and triethylene glycol, di- and tripropylene glycol, 1,4-butanediol, 1,6-hexanediol and bis(2-hydroxyethyl)hydroquinone, triols, for example 1,2,4- and 1,3,5-trihydroxycyclohexane, glycerol and trimethylolpropane, and low-molecular-weight hydroxylated polyalkylene oxides based on ethylene 1,2-oxide and/or propylene 1,2-oxide and on the abovementioned diols and/or triols as starter molecules.

Another embodiment of the present invention accordingly provides a process for the production of a composite element as described above where component B) comprises at least one polyether polyol with functionality from 3 to 8 and with hydroxy number in the range from 300 to 500.

Another embodiment of the present invention accordingly provides a process for the production of a composite element as described above where component B) comprises at least one polyether polyol with functionality from 3 to 8 and with hydroxy number in the range from 130 to 200.

Another embodiment of the present invention accordingly provides a process for the production of a composite element as described above where component B) comprises at least one difunctional chain extender.

If isocyanates used comprise isocyanate prepolymers, the content of compounds having groups reactive toward isocyanates is calculated with inclusion of the compounds which have groups reactive toward isocyanates and were used for the production of the isocyanate prepolymers.

Blowing agent used is preferably a blowing agent mixture comprising water. Water can be used alone here or in combination with other blowing agents. The water content of the blowing agent is preferably greater than 40% by weight, particularly preferably greater than 60% by weight and very particularly preferably greater than 80% by weight, based on the total weight of the blowing agent.

In particular, water is used as sole blowing agent. If other blowing agents are used alongside water, examples of those that can be used are fluorochlorocarbons, saturated and unsaturated fluorocarbons, hydrocarbons, acids and/or liquid or dissolved carbon dioxide. Another term used for unsaturated fluorocarbons is HFOs, derived from the word hydrofluoroolefin. Another embodiment can use, as blowing agent, a mixture of water and formic acid and/or carbon dioxide.

Blowing agent content, preferably water content, based on the total weight of components (B) to (F), is in the range from 0.05 to 4% by weight, particularly from 0.1 to 3% by weight.

Another embodiment of the present invention accordingly provides a process for the production of a composite element as described above where water is used as sole blowing agent C).

Another embodiment of the present invention accordingly provides a process for the production of a composite element as described above where the quantity of water used, based on the total weight of components B) to F), is in the range from 0.05 to 4% by weight.

Catalysts used can comprise any of the compounds that accelerate the isocyanate-water reaction or the isocyanate-polyol reaction. These compounds are known and are described by way of example in "Kunststoffhandbuch [Plastics handbook], vol. 7, Polyurethane [Polyurethanes]", Carl Hanser Verlag, 3$^{rd}$ edn., 1993, chapter 3.4.1. These comprise amine-based catalysts and catalysts based on organometallic compounds.

Catalysts that can be used and are based on organometallic compounds are by way of example organotin compounds, for example tin(II) salts of organic carboxylic acids, for example tin(II) acetate, tin(II) octanoate, tin(II) ethylhexanoate and tin(II) laurate and the dialkyltin(IV) salts of organic carboxylic acids, for example dibutyltin diacetate, dibutyltin dilaurate, dibutyltin maleate and dioctyltin diacetate, and also bismuth carboxylates, for example bismuth (III) neodecanoate, bismuth 2-ethylhexanoate and bismuth octanoate, or alkali metal salts of carboxylic acids, for example potassium acetate or potassium formate.

Catalyst used is preferably a mixture comprising at least one tertiary amine. These tertiary amines can also be compounds that also bear groups reactive toward isocyanate, for example OH groups, NH groups or $NH_2$ groups. Some of the catalysts most frequently used are bis(2-dimethyl-aminoethyl) ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene and diazabicyclononene. It is preferable that catalysts (e) used are mixtures comprising at least two different tertiary amines.

The term foam stabilizers is used for substances which promote the formation of a regular cell structure during formation of a foam. The following are mentioned by way of example: silicone-containing foam stabilizers, for example siloxane-oxalkylene copolymers and other organopolysiloxanes, and also alkoxylation products of the following: fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, polyvinyl alcohol, and also moreover alkoxylation products of condensates of the following: formaldehyde and alkylphenols, formaldehyde and dialkylphenols, formaldehyde and alkylcresols, formaldehyde and alkylresorcinol, formaldehyde and aniline, formaldehyde and toluidine, formaldehyde and naphthol, formaldehyde and alkylnaphthol, formaldehyde and bisphenol A, and mixtures of two or more of these foam stabilizers.

The quantity used of foam stabilizers is preferably from 0.5 to 4% by weight, particularly from 1 to 3% by weight, based on the total weight of components (B) to (F).

Other additives that can be used comprise fillers and other additional substances, for example antioxidants. Conventional additional substances are known to the person skilled in the art.

Another embodiment of the present invention accordingly provides a process for the production of a composite element as described above where the difference between the composition of the reaction mixture (R1) and of the reaction mixture (R2) relates to at least one of the components B) to F).

However, it is also possible in the invention that the composition of the reaction mixture (R1) is the same as that of the reaction mixture (R2).

Reaction mixture (R1) and reaction mixture (R2) can differ by way of example in respect of density, polyol composition, blowing agent used, and in particular fiber time. The reaction mixture (R1) usually has a longer fiber time than the reaction mixture (R2).

The vacuum insulation panels (VIPs) used in the invention are generally composed of a core material, for example open-cell rigid polyurethane (PUR) foam, open-cell extruded polystyrene foam, silica gels, glass fibers, unconsolidated plastics particles, compressed regrind made of rigid PUR foam or of semirigid PUR foam, or perlite, the latter being packed into a gastight film, which is evacuated and sealed by an airtight weld. The vacuum is preferably below 100 mbar. Given this vacuum, the thermal conductivity of the panels can be less than 10 mW/mK, depending on structure and pore size of the core material.

Examples of suitable core materials are Sica, glass fibers, and also polyurethane.

Preferred core materials in the invention are pressure-resistant materials such as polyurethanes, polystyrene or pressed silica, for example with density greater than 180 g/l. Surprisingly, it has been found that core materials with relatively high compressive strength in the unevacuated condition, in particular those with compressive strength greater than 160 kPa, lead to better, more uniform distribution of material and thus improve the conduct of the process, for example the introduction of VIPs, or else controlled deaeration, for avoidance of defects, and the quality of the molding, for example the quality of the surface.

The invention uses a first and a second outer layer which can be composed of the same material or a different material, and which can have different shapes. It is possible by way of example that one outer layer is composed of plastic and that the second is composed of metal.

The invention applies the reaction mixture (R1) to the first outer layer. The conduct of the process here is preferably such that escape of the reaction mixture is prevented. By way of example, a frame can be used for this purpose.

Another embodiment of the present invention accordingly provides a process for the production of a composite element as described above where the unhardened reaction mixture (R1) is applied into a device designed to prevent flow of the starting compounds away from the region of the first outer layer.

Another embodiment of the present invention accordingly provides a process for the production of a composite element as described above where the device is a press.

The retention device in a preferred embodiment is a press. In this case, the upper delimiting element acts as counterweight. The counterweight here can be displaced in a defined manner in order to permit setting of a defined separation. A feature of this preferred device is that the structure is open at the sides. The first outer layer is placed onto the lower delimiting element of the retention device. It is optionally possible to make additional use of a mold frame which delimits the fill area on the internal side. The reaction mixture (R1) used in the invention is then applied (optionally into the mold frame) to a substantial area of the first outer layer; a mass per unit area that has proven advantageous here is in the range from 200 to 9600 g/m$^2$. At least one VIP is placed onto the unhardened reaction mixture (R1), and the layer thickness of the PUR foam is set as described above. Before the reaction mixture (R1) hardens, the reaction mixture (R2) is applied onto the upper side of the VIP and finally the second outer layer. This is followed by the hardening of the foam system (R1) and (R2), preferably with use of a heat treatment for this purpose.

Another embodiment of the present invention accordingly provides a process for the production of a composite element as described above where step (v) is carried out at a temperature in the range from 35 to 80° C.

Another embodiment of the present invention accordingly provides a process for the production of a composite element as described above where step (v) is carried out in a press. It is preferable that the other steps of the process of the invention also take place in a press.

The composite elements of the invention are suitable for various applications. An example of a possible application is as component, in particular as door, of a refrigeration device. The term refrigeration devices in the invention means inter alia refrigeration-equipment housing (e.g. of refrigerators), vessels for refrigerated vehicles, coolboxes, cold stores or district-heating pipes. The composite elements are moreover suitable for construction applications, for example as thermally insulating cladding in the fitting-out of interiors, or as façade insulation in the exteriors sector.

The wall of the refrigeration device is either the internal side of the external wall of a refrigeration device or the external side of a wall of the internal vessel. The expression external wall of a refrigeration device is also considered to include the door of a refrigeration device (e.g. of a refrigerator), and the expression wall of the internal vessel is also considered to include the internal cladding of a door of a refrigeration device.

The external wall is usually made of metal, whereas the internal vessels and internal cladding are generally, and in particular in the case of refrigerators, made of a plastics material.

In another embodiment, the composite products can also be produced in a fully closed mold that is conventional in refrigerator construction. This variant is preferred when the VIP is applied to the external wall of the inliner of the refrigeration device or is applied to the internal cladding of the door of the refrigeration device.

Another embodiment of the present invention accordingly provides a process for the production of a composite element as described above where the composite element is a refrigerator component.

Another embodiment of the present invention accordingly provides a process for the production of a composite element as described above where the composite element is a sandwich element.

The present invention moreover provides a composite element obtainable or obtained in a process as described above.

The present invention accordingly provides a composite element obtainable or obtained in a process for the production of a composite element comprising a first and a second outer layer, a vacuum insulation panel between the two outer layers, rigid polyurethane foam in contact with the first outer layer and the underside of the vacuum insulation panel, and also rigid polyurethane foam in contact with the second outer layer and the upper side of the vacuum insulation panel, comprising the following steps:

(i) application of a reaction mixture (R1) for the production of a rigid polyurethane foam onto the first outer layer,
(ii) bringing the lower side of a vacuum insulation panel into contact with the unhardened reaction mixture (R1),
(iii) application of a reaction mixture (R2) for the production of a rigid polyurethane foam to the upper side of the vacuum insulation panel,
(iv) bringing the second outer layer into contact with the layer of the unhardened reaction mixture (R2),
(v) hardening of the two rigid polyurethane foam systems (R1) and (R2) to give the composite element.

The composite elements of the invention are dimensionally stable and can be used for various applications, for example as insulating construction materials. The present invention also provides the use of a composite element of the invention or of a composite element obtainable or obtained by a process of the invention as component for refrigeration devices or as construction material. The following may be mentioned by way of example: insulating panel, refrigeration units in trucks, pipe insulation, and special applications for insulation in the construction industry, examples being window profiles and rafter insulation.

Other embodiments of the present invention can be found in the claims and in the examples. The abovementioned features of the inventive subject matter/process/use, and the features thereof explained hereinafter, can of course be used not only in the respective stated combination but also in other combinations, without exceeding the scope of the invention. By way of example, the combination of a preferred feature with a particularly preferred feature, or of a feature that is not further characterized with a particularly preferred feature, etc., is also implicitly comprised even if said combination is not expressly mentioned.

Examples of embodiments of the present invention are listed below, but do not restrict the present invention. In particular, the present invention also comprises embodiments which result from the dependencies stated below and which therefore provide combinations.

1. A process for the production of composite elements comprising a first and a second outer layer, a vacuum insulation panel between the two outer layers, rigid polyurethane foam in contact with the first outer layer and the underside of the vacuum insulation panel, and also rigid polyurethane foam in contact with the second outer layer and the upper side of the vacuum insulation panel, comprising the following steps:
    (i) application of a reaction mixture (R1) for the production of a rigid polyurethane foam onto the first outer layer,
    (ii) bringing the lower side of a vacuum insulation panel into contact with the unhardened reaction mixture (R1), (iii) application of a reaction mixture (R2) for the production of a rigid polyurethane foam to the upper side of the vacuum insulation panel,
(iv) bringing the second outer layer into contact with the layer of the unhardened reaction mixture (R2),
(v) hardening of the two rigid polyurethane foam systems (R1) and (R2) to give the composite element.
2. The process according to embodiment 1, where the reaction mixtures (R1) and (R2) comprise the following components:
A) at least one polyisocyanate,
B) at least one polyfunctional compound reactive toward isocyanates,
C) at least one blowing agent,
D) at least one catalyst,
E) optionally foam stabilizers and
F) optionally further auxiliaries and/or additional substances.
3. The process according to embodiment 1 or 2, where the reaction mixture (R2) is applied while the reaction mixture (R1) is unhardened.
4. The process according to any of embodiments 1 to 3, where components A) to F) are selected in such a way as to give a closed-cell polyurethane foam with free-foamed envelope density in accordance with DIN 53420 in the range from 30 to 400 g/l and with compressive strength in accordance with DIN ISO 844 EN DE (2014-11) greater than 140 kPa.
5. The process according to any of embodiments 2 to 4, where water is used as sole blowing agent C).
6. The process according to any of embodiments 2 to 5, where the quantity of water used, based on the total weight of components B) to F), is in the range from 0.05 to 4% by weight.
7. The process according to any of embodiments 1 to 6, where the free-foamed envelope density in accordance with DIN 53420 of the rigid polyurethane foam obtained from the reaction mixture (R1) or of the rigid polyurethane foam obtained from the reaction mixture (R2) in the composite element or of the rigid polyurethane foam obtained from the reaction mixture (R1) and the reaction mixture (R2) is in the range from 30 to 400 g/l.
8. The process according to any of embodiments 2 to 7, where component B) comprises at least one polyether polyol with functionality from 3 to 6 and with hydroxy number in the range from 300 to 500.
9. The process according to any of embodiments 2 to 7, where component B) comprises at least one polyether polyol with functionality from 3 to 6 and with hydroxy number in the range from 130 to 200.
10. The process according to any of embodiments 2 to 9, where the difference between the composition of the reaction mixture (R1) and of the reaction mixture (R2) relates to at least one of the components B) to F).
11. The process according to any of claims 1 to 10, where the unhardened reaction mixture (R1) is applied into a device designed to prevent flow of the starting compounds away from the region of the first outer layer.
12. The process according to embodiment 11, where the device is a press.
13. The process according to any of embodiments 1 to 12, where step (v) is carried out at a temperature in the range from 35 to 80° C.
14. The process according to any of embodiments 1 to 13, where step (v) is carried out in a press.
15. The process according to any of embodiments 1 to 14, where the composite element is a refrigerator component.
16. The process according to any of embodiments 1 to 15, where the composite element is a sandwich element.
17. A composite element obtainable or obtained by a process according to any of embodiments 1 to 16.
18. The use of a composite element according to embodiment 16 or of a composite element obtainable or obtained by a process according to any of embodiments 1 to 16 as component for refrigeration equipment.
19. The use of a composite element according to embodiment 17 or of a composite element obtainable or obtained by a process according to any of embodiments 1 to 17 as construction material.

The examples below serve to illustrate the invention, but are in no way restrictive in respect of the subject matter of the present invention.

EXAMPLES

1. Experimental Description

TABLE 1

Details of foam systems

| Foam system | Cream time [s] | Fiber time [s] | Free envelope density [g/l] | Compaction factor | Density of molding [g/l] |
| --- | --- | --- | --- | --- | --- |
| R1 | 25 | 115 | 80 | 1.96 | 158 |
| R2 | 5 | 50 | 32 | 1.10 | 35 |
| R3 | 6 | 50 | 80 | 1.20 | 96 |

A plastics inliner is first inserted into a mold. The first reaction mixture (R1) for the production of a polyurethane foam is then applied to the first outer layer. The quantity of R1 introduced here was sufficient to fill a volume of 12 l and to obtain a density of ~158 g/l of the molding with foam thickness about 5 mm. Immediately after introduction of R1 ends (introduction time $T_{E1}$, see table 2), a silica VIP measuring 1300×5600×15 mm is brought into contact with the reaction mixture R1, which has not yet reached its fiber time. At the juncture $T_S$, as stated in table 2, a second reaction mixture (R2 or R3) is introduced, the quantity introduced here being sufficient to fill a volume of 71 l. Immediately after introduction of the second reaction mixture ends (introduction time $T_{E2}$ or $T_{E3}$, see table 2), a metal outer layer is superposed, and the mold is closed. Mold temperature during the entire experiment was 43° C. toward the bottom and 41° C. toward the top. After 20 min, the mold is opened, the component is removed, and the quality of the surface is evaluated optically. Where the component is evaluated optically as good, this means that the quality of the surface is high.

TABLE 2

Experimental details

| | Inventive example 1 | Inventive example 2 | Comparative example |
| --- | --- | --- | --- |
| First foam system | R1 | R1 | R1 |
| Introduction time $T_{E1}$ [in s] | 6 | 6 | 6 |
| Second foam system | R2 | R3 | R2 |
| Juncture at which second foam system is introduced $T_S$ [in s] | 42 | 44 | 85 |

TABLE 2-continued

Experimental details

|  | Inventive example 1 | Inventive example 2 | Comparative example |
|---|---|---|---|
| Introduction time $T_{E2}$ [in s] | 6 | – | 6 |
| Introduction time $T_{E3}$ [in s] | – | 10 | – |
| Optical evaluation of component | + | + | – |

2. Results

In inventive examples 1 and 2, the second foam system (R2 or R3) is introduced at the juncture $T_S$ (42 s or 44 s). The fiber time of R2 and R3 is 50 s. The sum of fiber time of second foam system (R2 or R3) and introduction time $T_S$ is therefore in both cases smaller than the fiber time of R1 (115 s, see table 1). A composite element was obtained which in optical evaluation revealed no defects.

In the comparative example, R2 is introduced at the juncture $T_S$=85 s. The fiber time of R2 is 50 s. The sum of fiber time of R2 and introduction time $T_S$ is therefore 135 s. This is 20 s longer than the fiber time of R1 (115 s, see table 1). A composite element with defects, and therefore poor surfaces, was obtained.

3. Definitions 3.1 Cream Time [s]

The cream time is defined as interval between start of stirring or start of shot and the beginning of volume expansion of the reaction mixture due to formation of foam.

3.2 Fiber Time [s]

The time from the start of mixing to the juncture during progress of the reaction at which fibers can be drawn by a glass rod from the foam composition.

3.3 Full Rise Time [s]

The full rise time is defined as interval between start of stirring and the end of volume expansion. It is determined by observing the height to which the top of the foam rises.

The invention claimed is:

1. A process for production of composite elements comprising a first and a second outer layer, a vacuum insulation panel between the first and second outer layers, rigid polyurethane foam in contact with the first outer layer and an underside of the vacuum insulation panel, and also rigid polyurethane foam in contact with the second outer layer and an upper side of the vacuum insulation panel, comprising the following steps:
   (i) applying a first unhardened reaction mixture ($R_1$) for the production of a rigid polyurethane foam onto the first outer layer,
   (ii) bringing the underside of a vacuum insulation panel into contact with the first unhardened reaction mixture ($R_1$),
   (iii) applying a second unhardened reaction mixture ($R_2$) for the production of a rigid polyurethane foam to the upper side of the vacuum insulation panel,
   (iv) bringing the second outer layer into contact with the layer of the second unhardened reaction mixture ($R_2$),
   (v) hardening of the first and second unhardened reaction mixtures ($R_1$) and ($R_2$) to give the composite element,
   wherein the first and second unhardened reaction mixtures ($R_1$) and ($R_2$) comprise the following components:
   A) at least one polvisocyanate,
   B) at least one polyfunctional compound reactive toward isocyanates,
   C) at least one blowing agent,
   D) at least one catalyst,
   E) optionally foam stabilizers and
   F) optionally further auxiliaries and/or additional substances,
   wherein the composition of the first unhardened reaction mixture ($R_1$) and of the second unhardened reaction mixture ($R_2$) differ in relation to at least one of the components B) to F).

2. The process according to claim 1, wherein the second unhardened reaction mixture ($R_2$) is applied while the first unhardened reaction mixture ($R_1$) is unhardened.

3. The process according to claim 1, wherein components A) to F) are selected to give a closed-cell polyurethane foam with free-foamed envelope density in accordance with DIN 53420 in the range from 30 to 400 g/l and with compressive strength in accordance with DIN ISO 844 EN DE (2014-11) of greater than 140 kPa.

4. The process according to claim 1, wherein water is used as sole blowing agent C).

5. The process according to claim 4, wherein the quantity of water used, based on the total weight of components B) to F), is in the range from 0.05 to 4% by weight.

6. The process according to claim 3, wherein the free-foamed envelope density in accordance with DIN 53420 of the rigid polyurethane foam obtained from the first unhardened reaction mixture ($R_1$) or of the rigid polyurethane foam obtained from the second unhardened reaction mixture ($R_2$) in the composite element or of the rigid polyurethane foam obtained from the first unhardened reaction mixture ($R_1$) and the second unhardened reaction mixture ($R_2$) is in the range from 30 to 400 g/l.

7. The process according to claim 1, wherein component B) comprises at least one polyether polyol with functionality from 3 to 6 and with hydroxy number in the range from 300 to 500.

8. The process according to claim 1, wherein the first unhardened reaction mixture ($R_1$) is applied into a device designed to prevent flow of the components away from a region of the first outer layer.

9. The process according to claim 8, wherein the device is a press.

10. The process according to claim 1, wherein step (v) is carried out at a temperature in the range from 35 to 80° C.

11. The process according to claim 1, wherein step (v) is carried out in a press.

12. The process according to claim 1, wherein the composite element is a refrigerator component or a sandwich element.

13. A composite element or obtained by a process according to claim 1.

14. A refrigeration equipment or construction material, comprising a composite element according to claim 13.

* * * * *